United States Patent [19]
Kirma

[11] Patent Number: 5,901,986
[45] Date of Patent: May 11, 1999

[54] CONNECTOR FOR JOINING PROTECTIVE DUCTS OR HOSES FOR THE INSTALLATION OF INSULATED ELECTRICAL CONDUCTORS IN AN AIRCRAFT

[75] Inventor: Safa Kirma, Wedel/Holstein, Germany

[73] Assignee: Daimler-Benz Aerospace Airbus GmbH, Hamburg, Germany

[21] Appl. No.: 08/794,501

[22] Filed: Jan. 24, 1997

[51] Int. Cl.[6] .................................................. F16L 39/00
[52] U.S. Cl. ................... 285/126.1; 285/154.1; 285/319; 285/321; 285/906; 285/901; 285/179.1; 174/65 R
[58] Field of Search .............................. 285/126.1, 179.1, 285/179.2, 272.1, 284.1, 153.1, 154.1, 319, 321, 901; 174/176 T, 65 R, 67, 61; 220/3.2; 292/299, DIG. 11

[56] References Cited

U.S. PATENT DOCUMENTS

| | | | |
|---|---|---|---|
| 401,927 | 4/1889 | Brooks | 174/65 R X |
| 877,684 | 1/1908 | Vibber | 174/61 X |
| 1,816,670 | 7/1931 | Church | 285/179.1 |
| 2,543,185 | 2/1951 | Mathieu | 285/906 X |
| 2,967,722 | 1/1961 | Lifka | 285/179.1 |
| 3,424,509 | 1/1969 | Siklos | 174/50 X |
| 3,686,425 | 8/1972 | Zerwes et al. | 174/67 X |
| 4,344,383 | 8/1982 | Salt | 118/503 X |
| 4,671,598 | 6/1987 | Keehne . | |
| 4,845,312 | 7/1989 | Lee | 174/65 R |

FOREIGN PATENT DOCUMENTS

| | | |
|---|---|---|
| 1142856 | 9/1957 | France . |
| 1347147 | 11/1963 | France . |
| 2050611 | 4/1971 | France . |
| 1260579 | 2/1968 | Germany . |
| 1985028 | 5/1968 | Germany . |
| 7239642 | 1/1973 | Germany . |
| 526215 | 9/1972 | Switzerland . |
| 257100 | 8/1926 | United Kingdom . |
| 2016215 | 9/1979 | United Kingdom . |

*Primary Examiner*—Dave W. Arola
*Attorney, Agent, or Firm*—W. F. Fasse; W. G. Fasse

[57] ABSTRACT

Connectors for joining protective ducts and/or hoses for the installation of insulated electrical conductors and/or cables in an aircraft are equipped with lids that are easily opened even without a tool. The lids are preferably permanently secured to the connectors. The lids are constructed as roll-up tapes or as a flat or curved plates. The curved plates are held in place in the closed condition by springs. A flat plate lid is held in place, for example by a circlip, or by a leg spring or by a hinge.

11 Claims, 7 Drawing Sheets

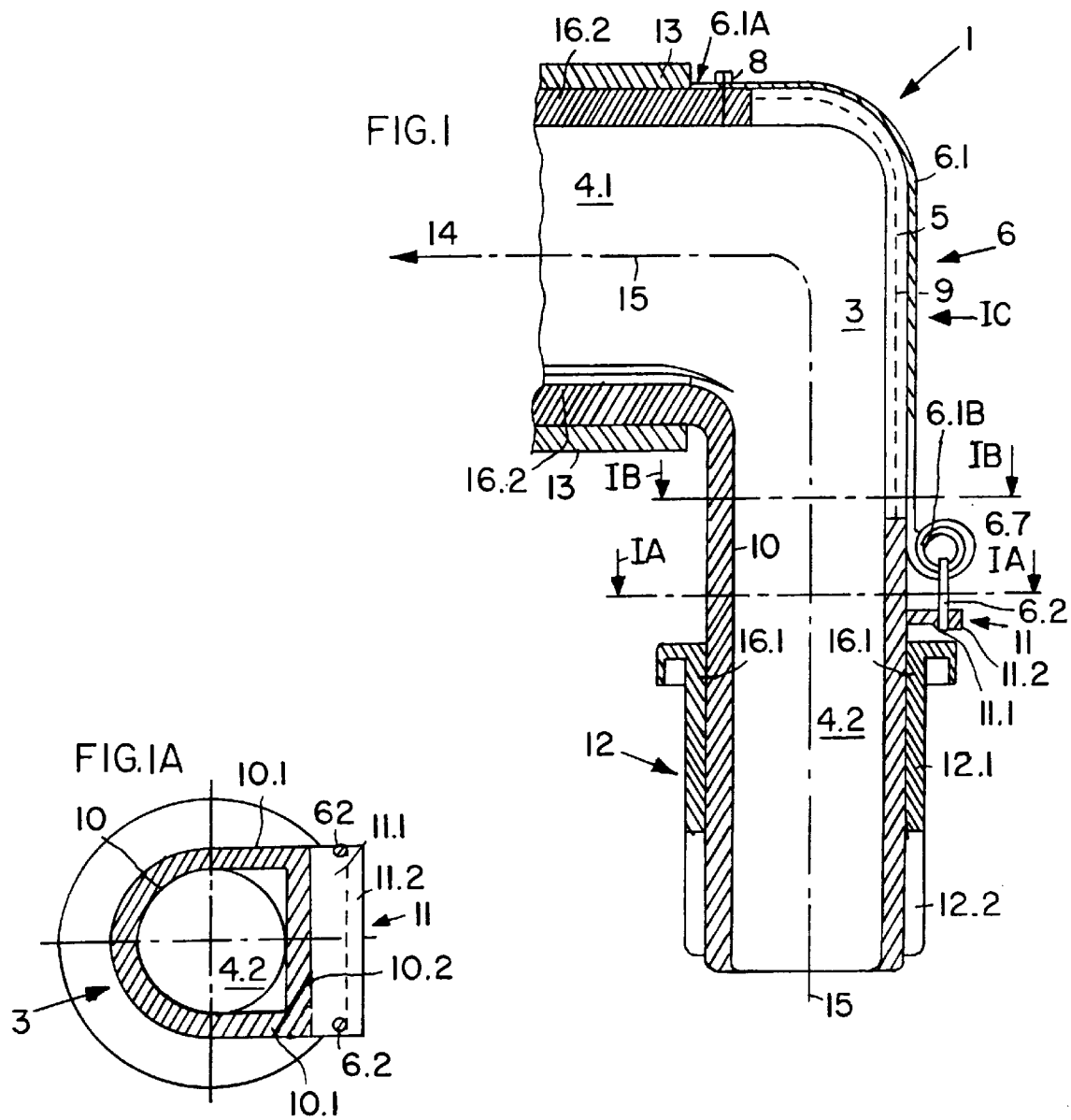
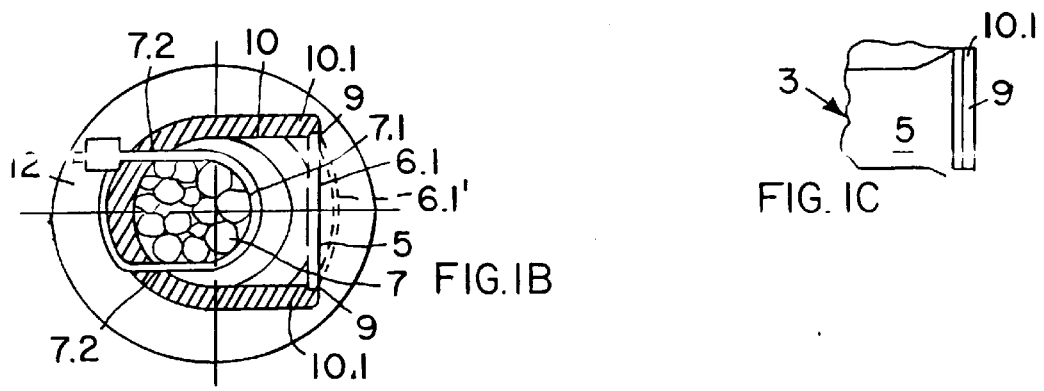

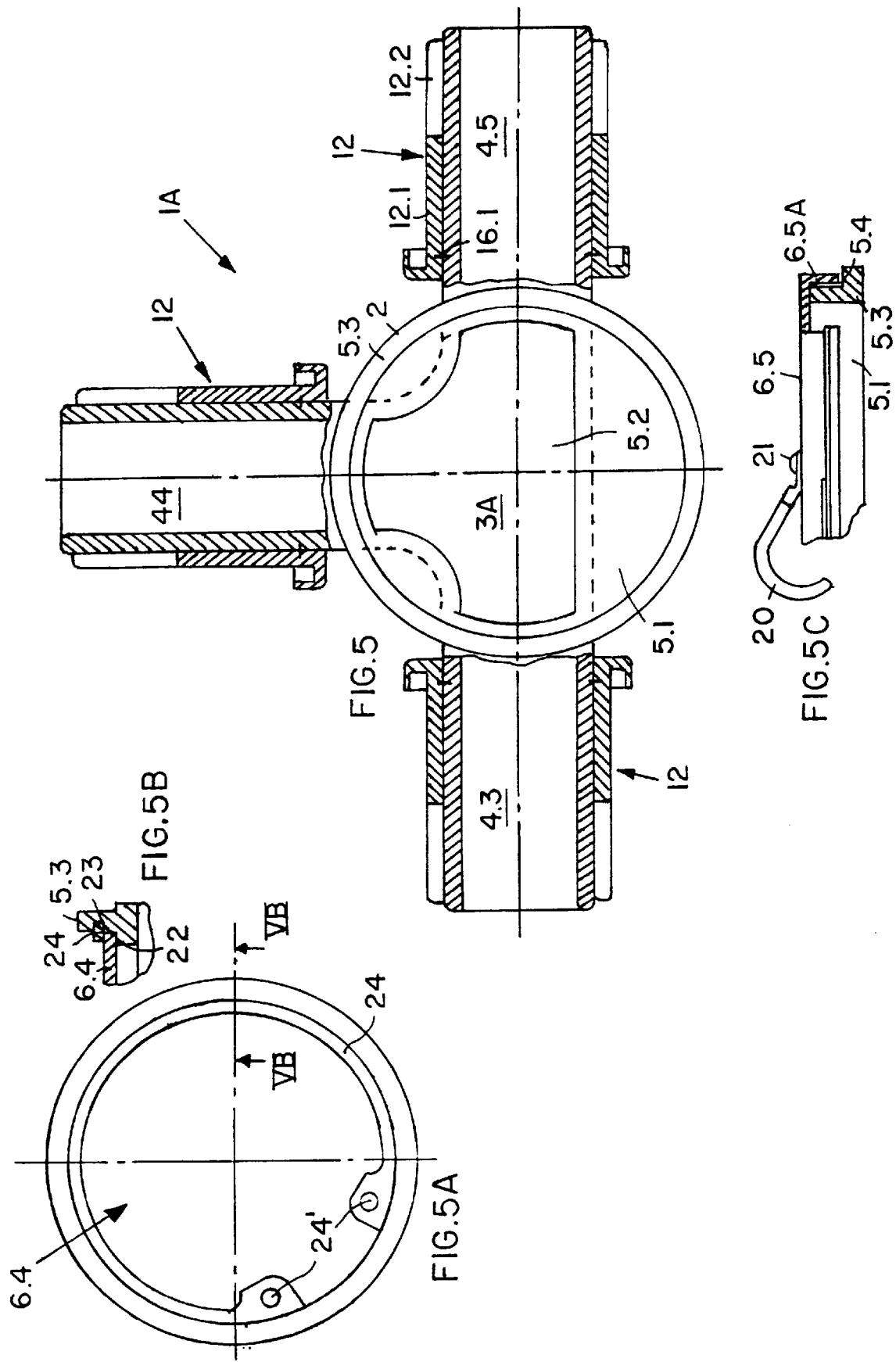

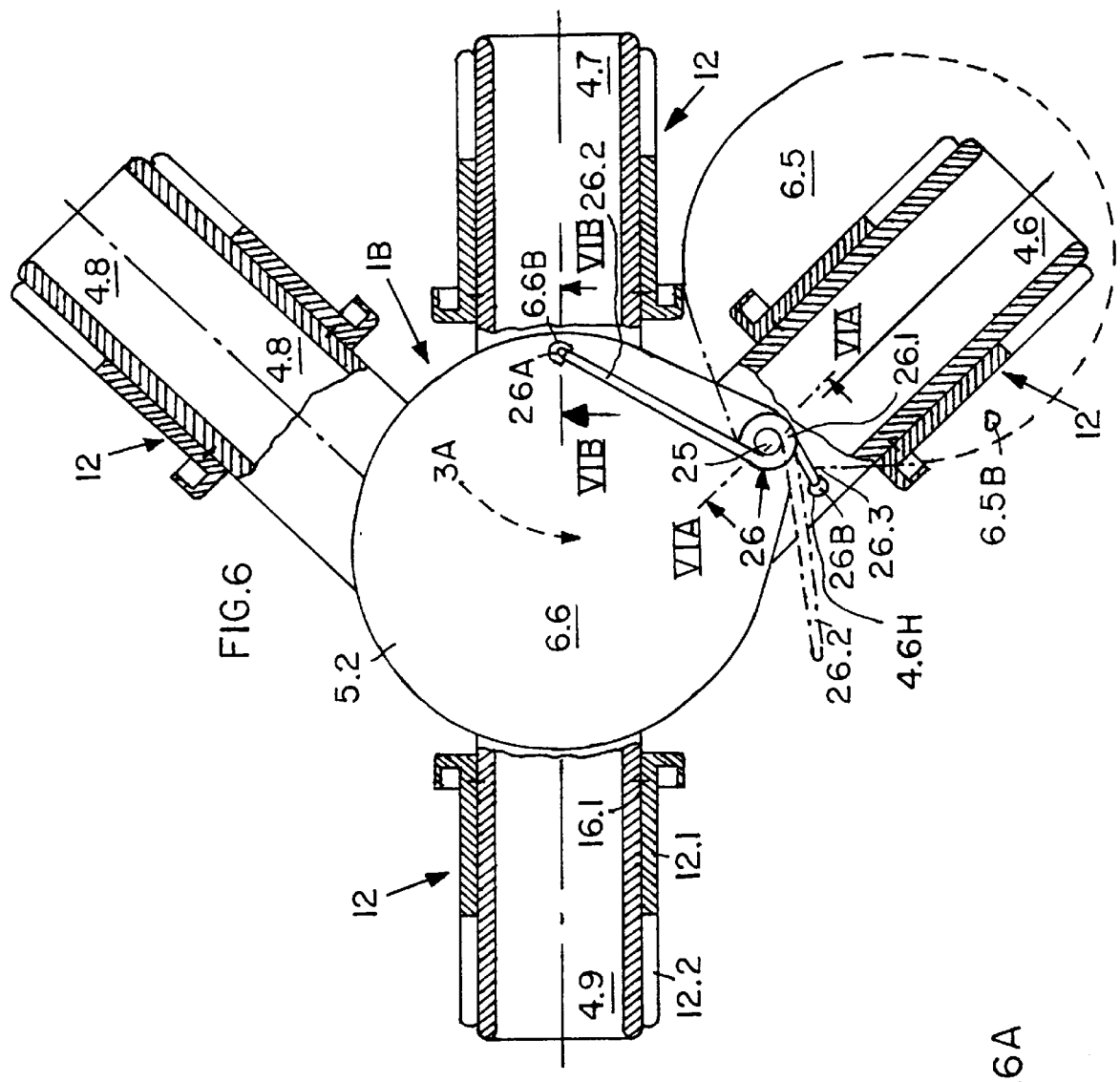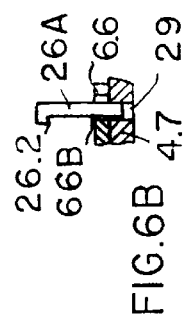

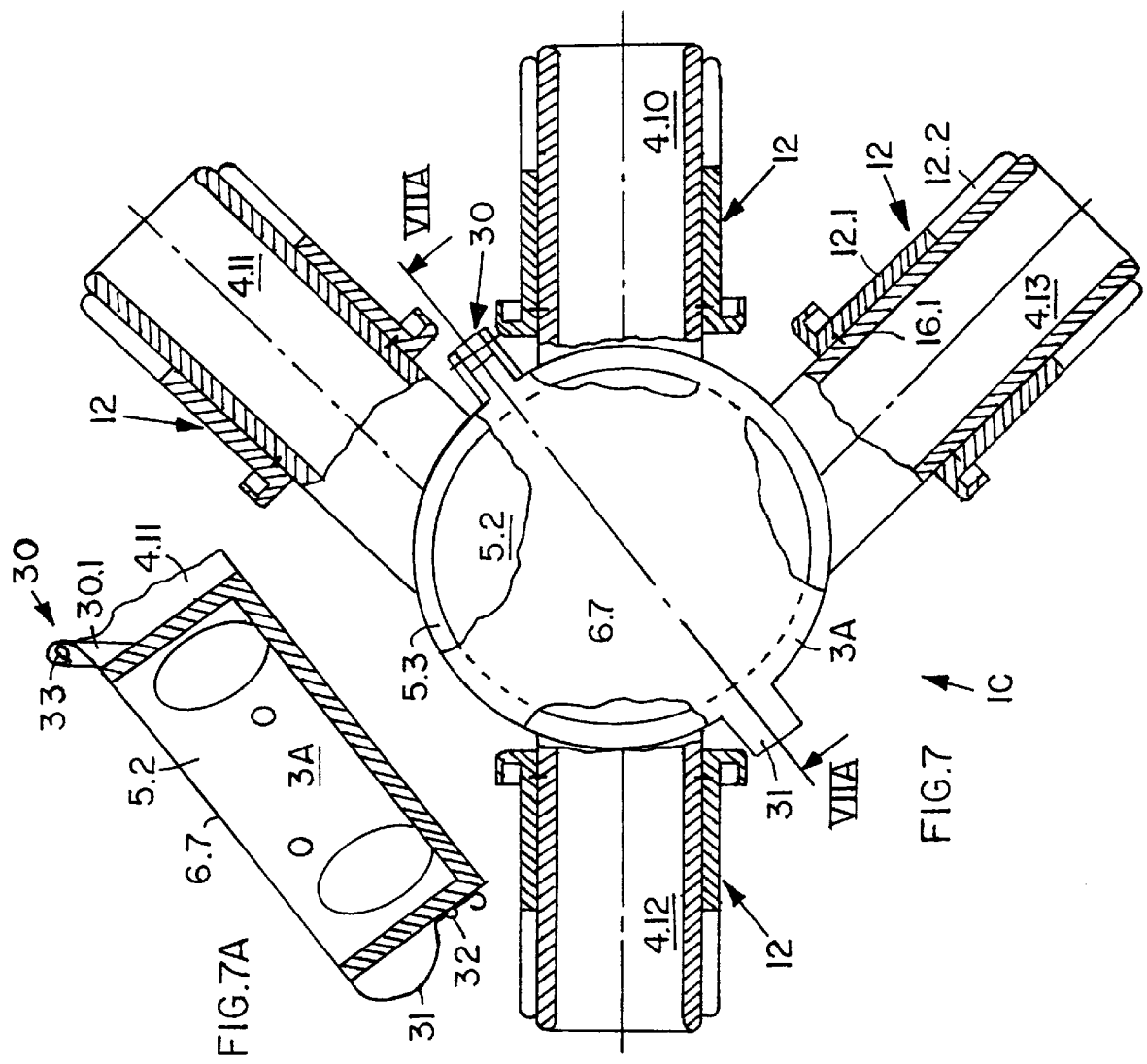

CONNECTOR FOR JOINING PROTECTIVE DUCTS OR HOSES FOR THE INSTALLATION OF INSULATED ELECTRICAL CONDUCTORS IN AN AIRCRAFT

FIELD OF THE INVENTION

The invention relates to connectors that join protective ducts or hoses to each other for the installation of cables and insulated electrical conductors in an aircraft. Such connectors are provided with openings coverable by a lid for installation, inspection, and maintenance of the conductors or cables. The closed lids also provide protection against contaminations entering into the connectors.

BACKGROUND INFORMATION

Connectors for the above purposes are known. Straight junctions, elbow junctions or T-junctions can be formed by such connectors. The connectors must provide at least as much protection as the ducts and/or hoses in which the electrical wires or cables are installed. Such connectors must also take into account the limited space available for such installations in an aircraft.

Conventional connectors leave room for improvement especially regarding the ease of access and the convenient reclosing of the access openings and with regard to avoiding any disassembly or even a partially disassembly of connector components.

U.S. Pat. No. 4,671,598, United Kingdom Patent 2,016,215, French Patent 1,142,856, and Swiss Patent 526,215 relate to connectors of the above type. These conventional connectors have a common feature in that a tubular connector member is divided into two halves which must be disassembled at least partly for providing the required access to the connector and which must then be assembled again upon completion of the work. More specifically, U.S. Pat. No. 4,671,598 shows two tubular connector sections that are fixed to each other by rings and a screw connection. The structure disclosed in British Patent Publication 2,016,215 is similar to that of the U.S. Patent, however the ring has been replaced by a sleeve. The constructions according to the French and Swiss Patents use connector half shells which interconnect separate channels for the conductors or cables. A problem with the just described conventional connectors is seen in the need for at least a partial disassembly of the connector when access is required.

French Patent Publication 2,050,611 (Goyer et al.), published Apr. 2, 1971 discloses a cylindrical tubing having an opening that is closeable by a removable lid for the purpose of inspecting wires installed in the tubing.

French Patent Publication 1,347,147 (Societe'), published on Nov. 18, 1963 discloses tubes forming protective ducts for electrical wires or cables. The ducts are provided with access openings and covers.

British Patent 257,100 (Hanff), published Aug. 26, 1926, discloses a suitably shaped plate that forms a normally closed cover hinged to a conduit or duct for electrical cables, the cover can be intentionally opened.

German Patent Publication 1,985,028 (Bosch), published May 9, 1968 discloses a T-coupling for cable ducts with covered access holes closeable by a cover and a seal. The respective access hole is at least as large as a cross-section of a duct or pipe portion opposite the hole which is arranged in alignment with the hole.

German Patent Publication 1,260,579 (Garrara), published Feb. 8, 1968, discloses a bushing for connecting two pipe sections holding electrical cables. The bushing has a hole or window and the pipe section also has a correspondingly shaped window. If the bushing is rotated relative to the pipe section the window can be opened or closed.

German Patent Publication 7,239,642 (Vedder), published Jan. 25, 1973, discloses a plug-in electrical outlet with covers having hinging axes extending in parallel to the plug-in direction.

OBJECTS OF THE INVENTION

In view of the above it is the aim of the invention to achieve the following objects singly or in combination:

to construct connectors of the type described above in such a way that opening and closing of the access lid can be done with ease without disconnection of any connector elements and without interruption of the operation of an installed system for inspection;

to especially adapt these connectors to a lightning protection system for the wiring in an aircraft;

to construct these connectors for joining protective ducts and/or hoses in a wide range of angular positions of these ducts or hoses and to also provide for multi-nipple connections;

to provide the connectors with slots for cable or conductor binders to hold these cables or conductors in a fixed position inside the connector; and to make the lids in such a way that they can be easily opened and closed repeatedly, preferably without removing the lids from the connector.

SUMMARY OF THE INVENTION

One connector embodiment according to the invention for joining sections of protective ducts or hoses for the installation of insulated electrical conductors or cables in an aircraft wiring system is characterized by a conductor body including a first body end section, a second body end section, and at least one intermediate body section between the end sections. The intermediate body section has an elongated opening for access into the connector and a lid is constructed as a flexible tape spring having a lid forming spring end and a wound-up spring end. The wound-up spring end is secured by securing elements to one of the body end sections and the lid forming spring end is releasably secured to the other body end section by further securing elements. The tape is biased in an opening direction, whereby the tape winds itself up when the lid forming tape end is free from its connection to the connector body.

Another embodiment of the connector according to the invention also comprises a connector body with first and second end section and an intermediate body section between the end sections with the access opening also positioned longitudinally in the intermediate body section. A lid is constructed as a rigid cover which has a lockable first cover end and a second cover end to be held in place by a spring. The first cover end is releasably locked or held by first securing elements to one of the body end sections of the first and second body end sections while a second cover end cooperates with second securing elements including a spring for securing the second cover end to the other body end section. The spring of the second securing elements may be a compression spring or a tension spring. The compression spring cooperates with a conical cover portion that is part of the second cover end section for urging or biasing the rigid cover into a closed position. The tension spring is for example a helically wound spring which is interlocked at its end to form a ring that urges the second cover end of the rigid cover into a closed position.

In a third embodiment of the connector according to the invention a connector body forms a box with an open first end section and a closed second body end section. An intermediate body section between the first and second body end sections comprises a plurality of nipples communicating through holes in the wall of the intermediate body section with the interior of the connector body. The nipples are adapted for connection to the protective ducts or hoses. The connector body forms a box that surrounds a cavity in the box through which the insulated electrical conductors pass, since the nipples provide access for the electrical conductors into the cavity in the box through the holes in the walls. A rim surrounds the open first body end section and cooperates with a lid constructed as a plate for closing the open first body end section and thus the box. A securing device that may take different constructions secures the plate to the rim of the open first body end section in an openable manner for providing access to the cavity. The lid or cover plate also referred to as plate lid normally closes the open first body end section. The securing device may, for example, include a groove facing radially inwardly in the rim and a spring ring that holds the plate lid on the rim. In another construction the securing device includes a threading on the lid and on the rim for securing the plate lid to the rim. The lid may also be urged into a closing position by a biasing spring secured to the box. Alternately, the securing device may include a hinge and a locking member for normally securing the lid to the rim of the box in a tight manner, preferably also with a spring bias in the closing direction.

BRIEF DESCRIPTION OF THE DRAWINGS

In order that the invention may be clearly understood, it will now be described, by way of example, with reference to the accompanying drawings, wherein:

FIG. 1 shows and axial section through a 90° elbow connector according to the invention with a lid or cover constructed as a flexible tape spring;

FIG. 1A is a section along section line IA—IA showing the D- or C-cross-section of one body end section;

FIG. 1B is a sectional view along section line IB—IB to illustrate the position of a conductor binder;

FIG. 1C is a plan view in the direction of the arrow IC in FIG. 1 with the lid or cover not shown since it is in an open position;

FIG. 5 is a top plan view, partly in section, of another embodiment of a T-connector according to the invention with three connector nipples and an access opening facing the viewer and with the lid removed;

FIG. 5A is a view as in FIG. 5, however without the connector nipples, but illustrating a lid held in place by a circlip or spring ring;

FIG. 5B is a sectional view along section line VB—VB in FIG. 5A showing the lid resting on a shoulder and held in place by the spring ring;

FIG. 5C illustrates the connection of a lid to the rim of a connector of FIG. 5 by threadings;

FIG. 6. is a view similar to that of FIG. 5, however illustrating a connector with four nipples and a lid urged into a closed position by a leg spring;

FIG. 6A is a sectional view along section line VIA—VIA in FIG. 6 showing the mounting of the leg spring;

FIG. 6B is a sectional view along section line VIB—VIB in FIG. 6 showing the locking of the lid to the connector body in a closed lid position;

FIG. 7 is a view similar to that of FIG. 6, however illustrating a different lid construction with a hinge and closure strip; and FIG. 7A is a sectional view along section line VIIA—VIIA in FIG. 7 showing the hinged lid.

Figure 2:
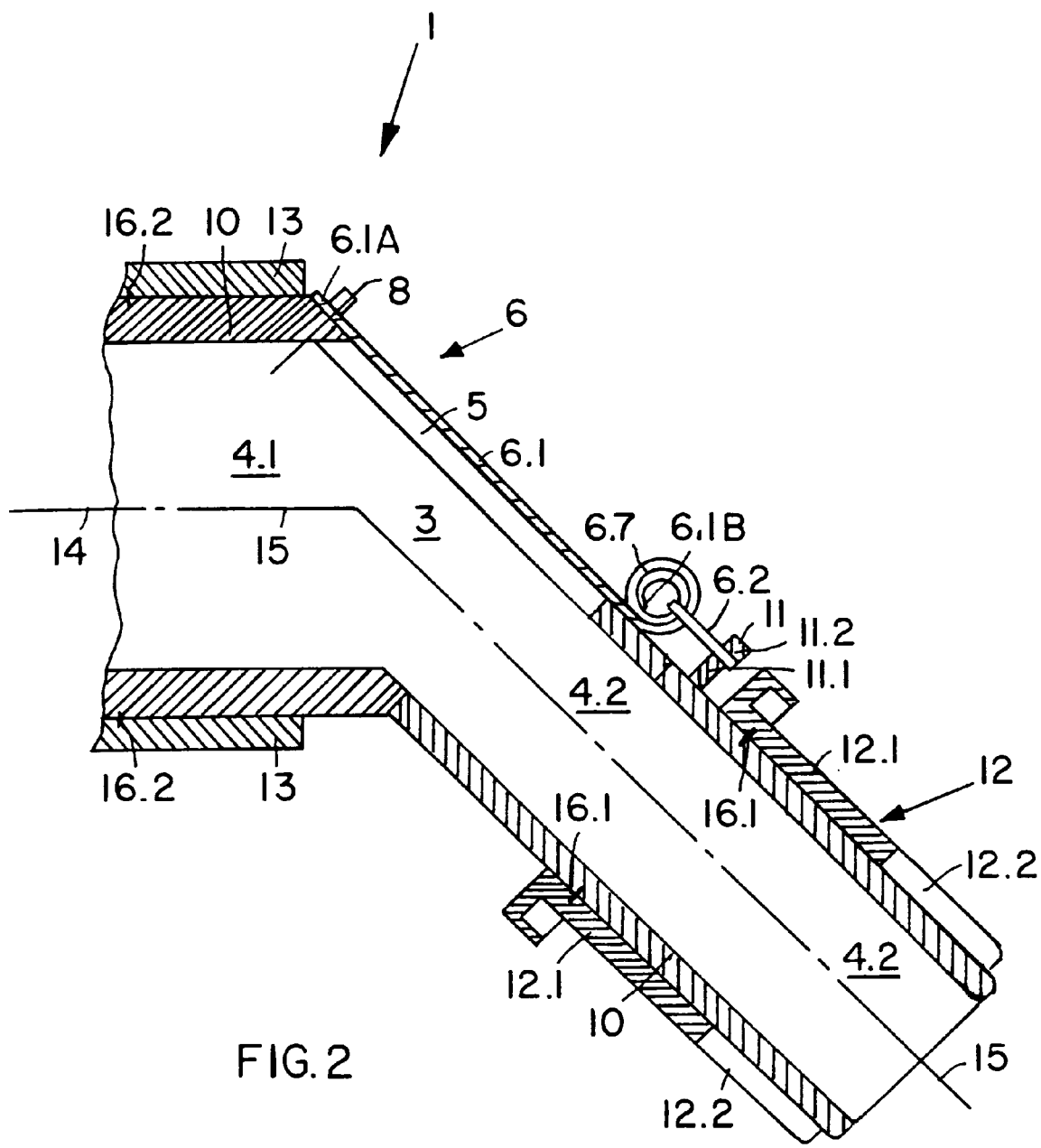
FIG. 2 is a sectional view similar to that of FIG. 1, however showing a 45° elbow connector.

DETAILED DESCRIPTION OF PREFERRED EXAMPLE EMBODIMENTS AND OF THE BEST MODE OF THE INVENTION

FIG. 1 shows a 90° elbow connector 1 according to the invention. Electrical conductors 7 shown in FIG. 1B are held in place by a cable binder 7.1 passing through slots 7.2 in the wall 10 of the cable connector. The conductors 7 and binder 7.1 are only shown in FIG. 1B, but not in FIG. 1 nor in any of the other Figures. The connector 1 comprises a tubular body with a plurality of sections, for example a central section 3, a first end section 4.1, and a second end section 4.2. The end sections form nipples for connection to protective ducts or hoses, i.e. conduits, of conventional construction. The central or intermediate section 3 has an opening 5 extending longitudinally in the wall 10 of the central section and substantially in parallel to the central axis 15 of the connector. The opening 5 is closed by a lid 6 according to the invention constructed as a flexible tape spring 6.7. The edges 10.1 that extend along the opening 5 are provided with a groove or shoulder 9 that is covered by the lid 6. The groove or shoulder 9 also guides the lid. The lid 6 has a cover section 6.1 with a free end 6.1A that is wide enough to cover the groove 9 on both sides of the opening 5. The free spring end 6.1A of the tape lid 6 is held in place by a closure member 8 such as a screw, pin, snap fastener, or the like to normally close the opening 5. The closure member 8 is secured to one end section 4.1.

Referring further to FIG. 1, the end section 4.1 carries a connector or coupling nut 13 rotatably secured to the end section 4.1 by a locking ring 16.2 that permits relative rotation, but prevents axial displacement of the coupling nut 13 relative to the end section 4.1. Similarly, a further coupling nut or coupling bushing 12 is rotatably secured to the second end section 4.2 by a locking ring 16.1 which prevents a relative axial displacement of the bushing 12. The bushing 12 has two sections 12.1 and 12.2. The section 12.1 is circumferentially closed, while the section 12.2 is provided with axial slots that form electrical contact springs for assuring a good electrical contact between the end section 4.2 and any duct pipe or hose that is connected to the connector 1 with the help of the bushing 12 or the coupling nut 13 for the protection of the cables or conductors 7 especially against lightning effects. Hence, the connector and the nut and bushings are made of electrically well conducting materials or have coatings of such materials.

The protective ducts or hoses are not shown, but normally lead to another connector according to the invention or any other component 14 forming part of the installation such as plug-in connectors. The contact springs formed in the section 12.2 are biased radially inwardly to provide a good electrical contact between the connector 1 and the protective duct or hose.

The other end 6.1B of the tape spring 6.7 is wound up and releasably secured by an eyelet 6.2 held in place behind a shoulder 11.1 of a hook 11.2 formed on a flange 11 secured to the end section 4.2. The rolled up tape spring 6.7 has a biasing force that urges the tape to wind itself up, whereby the eyelet 6.2 and with it the lid 6 are normally securely held in place to close the opening 5 when the free end 6.1A is secured by the closure member 8. For opening the lid 6, it is merely necessary to unhook the eyelet 6.2, whereby the tape will further wind itself up until it rests against the securing element 8. The opening 5 is closed again by simply pulling the tape 6.7 downwardly until the eyelet 6.2 is safely secured to the hook 11.2. The tape 6.7 is either flat as shown at 6.1 in FIG. 1B or slightly vaulted as shown by dashed lines 6.1' in FIG. 1B. In both instances the longitudinal tape edges rest on or in the grooves or shoulders 9 along the edges 10.1 of the opening 5. These "grooves" 9 may be a step in the edges 10.1 along the opening 5 as seen in FIG. 1B. FIGS. 1A and 1B show that the wall portion 10 of the central section preferably has a C-or U-cross-sectional configuration or a D-configuration since the wall 10.2 closes the C-configuration.

The flange 11 forming the hook 11.2 with its shoulder 11.1 is also shown in FIG. 1A. FIG. 1B shows that the conductors 7 are preferably held by the cable binder 7.1 in the bottom of the C- or U-cross-sectional configuration whereby the legs of the cable binder 7.1 pass through respective slots 7.2 in the wall 10 of the central body section of the connector 1. The flange 11 preferably has a length, as best seen in FIG. 1A corresponding to the outer width of the wall or edge sections 10.1. A plurality of slots 7.2 may be provided spaced from one another in the direction of the longitudinal axis 15 in order to tie down the conductors 7 at several places to protect the conductors 7 against vibrations and impacts to which the connector 1 may be exposed.

Incidentally, the width of the tape 6.7 and the width between the grooves or shoulders 9 should be selected for a tight fit to provide a proper seal of the opening when it is closed by the lid 6.

Figure 3:
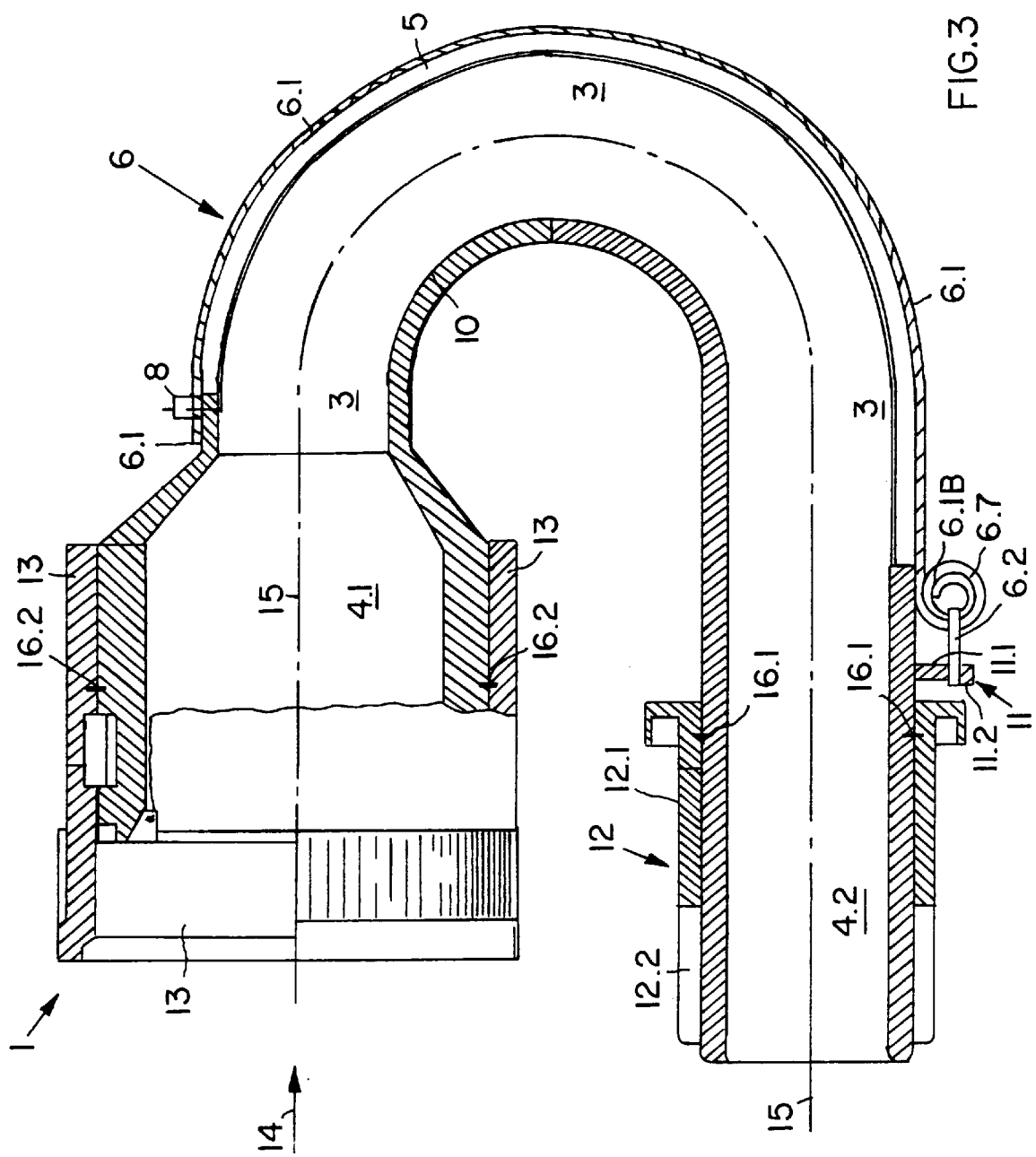
FIG. 3 is a sectional view similar to that of FIG. 1 and 2, however showing a 180° elbow having an access opening reaching over more than 180° with a tape spring lid covering the entire opening.

The above description of FIGS. 1, 1A, 1B and 1C applies equally to FIGS. 2 and 3, except that FIG. 2 shows a 45° elbow while FIG. 3 illustrates a 180° elbow. Further, while the groove 9 is preferred for sealing and tape guide reasons, such a groove or shoulder is not absolutely necessary since the tap may be wide enough so that its edges rest in a sealing manner on the edges 10.1 of the wall 10 forming the body of the connector 1.

Figure 4:
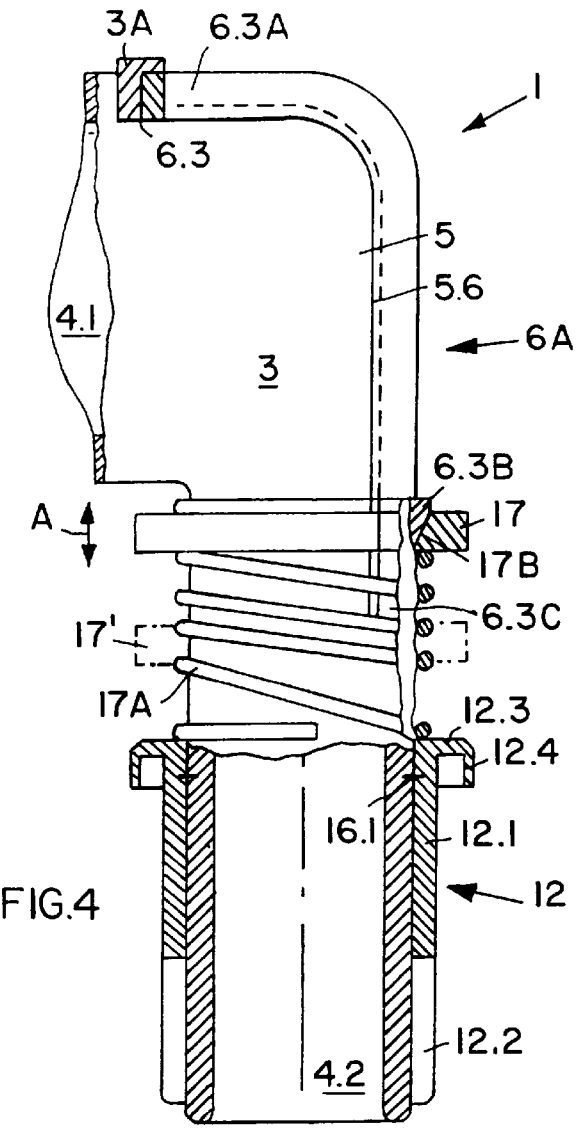
FIG. 4 illustrates a side view, partially in section, of a 90° elbow connector according to another embodiment of the invention with a rigid cover held in its closing position by a compression spring.

FIG. 4 illustrates another embodiment of the connector according to the invention wherein the same components have the same reference numbers as in the above described figures. The base body or intermediate body 3 again forms a 90° elbow as in FIG. 1. The elbow has the same end sections 4.1 and 4.2. In FIG. 4 the lid 6A is of rigid construction rather than a flexible tape. The lid 6A is mounted and secured so that it can be removed for opening or attached for closing the inspection opening 5 any time as desired. For this purpose the cover 6A has an upper end 6.3A provided with a shoulder or tongue 6.3 that is inserted in a respective shoulder or groove of a locking and guide member 3A forming part of the central body section 3 close to the end section 4.1. The cooperation of the tongue and groove or respective shoulder 6.3 makes sure that the cover or lid 6A cannot escape upwardly. The other end 6.3B of the lid or cover 6A is provided with a locking section that preferably has a conical or slanted surface for cooperation with a locking ring 17 biased by a compression spring 17A, the lower end of which rests against the flange 12.3 of the mounting bushing 12 while the upper end of the compression spring 17A rests against the locking ring 17, whereby the compression force of the spring 17A causes the two slanted surfaces of the locking section 6.3B and the ring 17 to cooperate for locking the lid or cover 6A in place. The lid 6A preferably rests against a groove or shoulder 5.6 along the longitudinal edges of the opening 5 in the central body section 3 similar to the groove or shoulder 9 described above with reference to FIG. 1C. The slanted surfaces at 6.3B may be an integral part of the lid 6A without actually forming a ring section. Rather, the lid 6A may be flat, whereby the section 6. 3B would be straight. When the lid 6A is to be removed, the ring 17 is manually pushed down as indicated by the arrow A into the dash-dotted position 17', whereby the lid 6A is easily removable. Arrow A also illustrates the upwardly effective biasing force of the compression spring 17A.

Incidentally, the bushing 12 with its flange 12.3 is preferably provided with an axially extending ring wall 12.4 to form a ring groove in which a protective duct or hose can be mounted and secured. The duct or hose is not shown. For replacing and locking the lid 6A, the ring 17 is again pushed downwardly, the lid inserted, and then the ring 17 is released, whereby the spring 17A pushes the ring 17 against the conical or rather slanted surface at 6.3B. While the conical surfaces 17B provide a positive locking, it is also possible to provide other cooperating surfaces in the form of rectangular shoulders or the like.

Figure 4A:
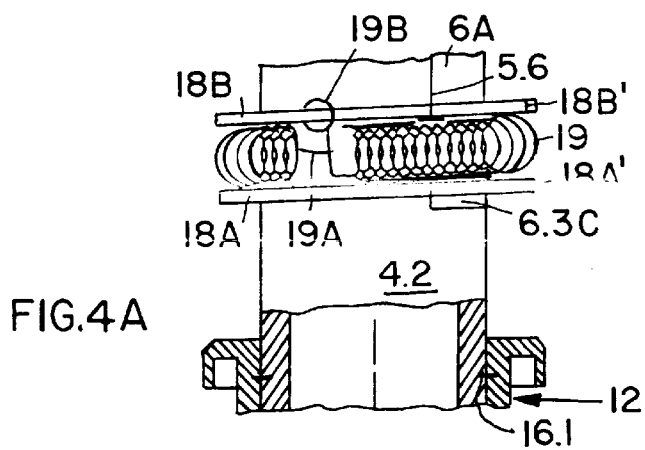
FIG. 4A is a broken-away side view, partly in section of a modified version in which the rigid cover is held in its closed position by a tension spring.

FIG. 4A illustrates a modification of the embodiment of FIG. 4 in that the compression locking spring 17A and the components cooperating with the compression spring for locking the lower lid end 6.3C in place, have been replaced by a tension spring 19 that is preferably guided between four flange sections 18A, 18A' below the spring 19 and 18B and 18B, above the spring 19. The flange sections are divided so that they can be opened when the spring end 19A is unhooked from the spring end 19B which is preferably secured to a fixed point such as the flange 18B. The flange sections 18A and 18B may be secured to the body of the connector 1. Thus, the spring 19 in its interlocked condition is held in place around the lower end 6.3C of the lid 6A. However, it would be possible to avoid the flange sections altogether and merely connect one spring end 19B to the body of the connector 1. Otherwise, the construction of the lid, especially its upper end and of the guide and locking element 3A are the same in FIG. 4A as in FIG. 4.

FIG. 5 shows a third embodiment of a connector 1A of the invention constructed as a T-connector having a connector body 2 that forms a box 3A with an open first body end section having an opening 5.1 surrounded by a rim 5.3. The other end of the box is formed as a closed second body end section. The box 3A encloses a cavity 5.2 communicating through the wall of the box with three connector nipples 4.3, 4.4, 4.5 to form the T-configuration. Each connector nipple is surrounded by a coupling bushing 12 as described above. These nipples with their bushings are connectable to protective ducts or hoses not shown. The electrical conductor 7 shown in FIG. 1B pass through these connector nipples and through the cavity 5.2 in which the conductors are accessible through the opening 5.1 when a lid or cover 6.4 shown in FIG. 5A is removed as shown in FIG. 5.

In FIG. 5A the lid 6.4 is constructed as a flat plate lid for closing the opening 5.1, the flat plate is held in place by a circlip or spring ring 24 which in turn is held in a groove 23 in the rim 5.3 as best seen in FIG. 5B. The lid 6.4 rests on a shoulder 22 of the rim 5.3. The lid 6.4 can be opened by pulling the ends 24' of the clip 24 together to remove the clip from the groove 23.

FIG. 5C shows another lid construction, wherein the lid 6.5 has an axially extending flange 6.5A surrounding the rim 5.3. Threadings 5.4 are provided between the rim 5.3 and the axial flange 6.5A to secure the lid 6.5 to the rim 5.3 for closing the opening 5.1. However, the threadings may also be provided on the inside of the rim 5.3, whereby the axial flange 6.5A would have a diameter with an external threading to fit into the rim 5.3. FIG. 5C further shows that the lid 6.5 can be secured by a flexible element 20 and a screw 21 to a fixed point, e.g. of the connector 1A so as not to lose the lid 6.5. Normally the screw 21 would permit rotation of the lid 6.5 relative to the fixed point so as not to twist off the connecting element 20. The elements 20 and 21 may also be used in FIG. 5A to facilitate the lifting of the lid 6.4 off the shoulder 22 when the spring ring or clip 24 is removed.

FIG. 6 shows an embodiment quite similar to that of FIG. 5, however in FIG. 6 the connector 1B has a central box 3A with four coupling nipples 4.6, 4.7, 4.8, and 4.9, each surrounded by its coupling bushing 12 as described. In FIG. 6 the cavity 5.2 inside the box 3A of the connector central body is closed by a substantially circular plate lid 6.6 which is shown locked in its closed position by a leg spring 26 that has a central helically wound portion 26.1 with a long leg 26.2 at one end of the wound portion 26.1 and a short leg 26.3 at the other end. The long spring leg 26.2 has a free end 26A. The central portion 26.1 is anchored on a stud 25 rigidly secured, for example, to the upwardly facing wall of the nipple 4.6. The short leg 26.3 has a free end 26B engaging a hole 4.6H in the wall of the nipple 4.6.

Referring to FIG. 6B, the free end 26A of the long spring leg 26.2 passes through a hole 6.6B in the cover or lid 6.6 and into a hole 29 in the top wall of the nipple 4.7, whereby the lid 6.6 is locked in the closed position.

Referring to FIG. 6A, the sectional view shows the stud 25 rigidly secured to the wall of the nipple 4.6 and the lid 6.5 hinged to the stud 25 which reaches through a hole 6.6A in the lid 6.6. The spring 26 surrounds with its wound-up portion 26.1 the stud 25. A washer 27 held in place by a cotter pin 28 keeps the spring in position on the stud 25. Preferably the wound up spring portion 26.1 forms a compression spring that presses the lid 6.6 against the rim 5.3 shown in FIG. 5 when the lid is closed.

In order to open the lid 6.6, the free end 26A is lifted out of the hole 6.6B and out of the hole 29, whereby the long leg 26.2 assumes the dash-dotted position shown in FIG. 6, due to the torque bias stored in the spring 26, whereby the lid 6.6 is now free to be rotated clockwise about the stud 25 into the dashdotted open position above the top wall of the respective nipple 4.6. The arrangement is such, that the lid 6.6 will tightly rest on the rim 5.3 surrounding the box 3A of the connector 1B while also being able to pass freely over the top walls of the nipples 4.7 and 4.6. Any of the nipples can be used for mounting the stud 25. When the lid 6.6 is in its open dash-dotted position, the spring legs 26.1 and 26.2 are not biased. The biasing, however, is reestablished when the lid is turned counterclockwise into the closed position and the free end 26A of the long spring leg 26.2 reengages the hole 6.6B in the lid and the hole 29 in the nipple 4.7. In this condition, and due to the washer 27 held in place by the cotter pin 28, the central wound-up spring section 26.1 can act as a compression spring on the lid 6.6, thereby pressing the lid into tight contact with the rim 5.3 not seen in FIG. 6.

FIG. 7 is a view and connector structure similar to that shown in FIG. 6, however, the connector 1C of FIG. 7 has a different lid structure. The connector 1C again has a central box 3A with four nipples 4.10, 4.11, 4.12, and 4.13. Each nipple leads through an opening O, as in FIGS. 5 and 6 into the cavity 5.2 in the box 3A that has a rim 5.3 normally covered by a cover 6.7. As best seen in FIG. 7A, the cover 6.7 has a hinge 30 secured by a hinge pin 33 to a hinging arm 30.1 supported by the box 3A. Diametrically opposite the hinge 30 the cover 6.7 has a handle 31 that is secured to the wall of the box 3A by a closure member 32 such as a pin or latch or snap fastener or the like. The closure member 32 is so positioned and the handle 31 is so curved that the lid 6.7 will tightly contact the rim 5.3 of the box 3A all around. The hinge 30 and the handle 31 are preferably so positioned that a slight bias in the closing direction is achieved.

The invention has several advantages. The lids of the invention protect the cables or wire 7 inside the connectors when the lids are closed. Further, an easy and convenient access is achieved for inspection, maintenance and installation work. Another very important advantage is the fact that inspection and maintenance work can be accomplished normally without interrupting the operation of the system and without physically disassembling any other connector parts, except for opening the lid. Further, the present lids are held in position even in their open state so that they cannot accidentally drop or be lost. With the help of the slot 7.2, it is simple to secure the conductor 7 directly inside the present connectors by the binder 7.1. Such tie down further protects the conductors against adverse influences in their operating condition. The present lids can be opened with a minimal effort and even without tools.

Although the invention has been described with reference to specific example embodiments, it will be appreciated that it is intended to cover all modifications and equivalents within the scope of the appended claims.

What is claimed is:

1. A connector for joining sections of protective conduits for the installation of insulated electrical conductors in an aircraft, comprising a connector body forming a box (3A) including an open first body end section having an opening therein, a rim (5.3) including a shoulder (22) and a radially inwardly facing groove (23) surrounding said opening of said open first body end section, a closed second body end section and an intermediate body section (3) between said first and second body end sections, said box surrounding a cavity (5.2) in said box, said intermediate body section (3) comprising a wall having a plurality of holes (0) therein and nipples (4.3; 4.4; 4.5) connected to said wall and communicating with said holes, said nipples being adapted to have said conduits connected thereto and to provide access for said electrical conductors into said cavity (5.2) through said holes, a plate lid (6.4, 6.5; 6.6, 6.7) removably resting on said shoulder and covering said opening of said open first body end section, and a spring ring removably engaged in said groove (23) and retaining said plate lid between said spring ring and said shoulder, wherein said spring ring and said plate lid are removable for providing access to said cavity (5.2) through said opening.

2. The connector of claim 1, further comprising a flexible, elongated element having a first end secured to said plate lid and a second end secured to said connector body.

3. The connector of claim 1, wherein said nipples are integrally formed as one piece with said wall of said intermediate body section.

4. The connector of claim 1, further comprising a plurality of coupling bushings respectively arranged externally on said nipples, and a plurality of locking rings respectively fixing said bushings to said nipples to allow rotation and prevent axial displacement therebetween.

5. The connector of claim 4, wherein each said coupling bushing comprises a first circumferentially closed part arranged proximally to said intermediate body section and a second part having axial slots therein arranged distally from said intermediate body section.

6. A connector for joining sections of protective conduits for the installation of insulated electrical conductors in an aircraft, comprising a connector body forming a box (3A) including an open first body end section having an opening therein, a rim (5.3) surrounding said opening of said open first body end section, a closed second body end section and an intermediate body section (3) between said first and second body end sections, said box surrounding a cavity (5.2) in said box, said intermediate body section (3) comprising a wall having a plurality of access holes (O) therein and nipples (4.3; 4.4; 4.5) connected to said wall and communicating with said access holes, said nipples being adapted to have said conduits connected thereto and to provide access for said electrical conductors into said cavity (5.2) through said access holes, a hinge pin (25) rigidly secured to said connector body, a plate lid (6.4, 6.5; 6.6, 6.7) having first (6.6A) and second (6.6B) holes therein and being lournalled on said hinge pin which is received in said first hole, said connector body having third (29) and fourth (4.6H) holes therein, and a biasing leg spring (26) having a wound central section (26.1) mounted on said hinge pin (25) on an outer side of said plate lid (6.6) facing away from said connector body, a long spring leg (26.2) with a first free end (26A) extending through said second hole (6.6B) in said plate lid and at least partly through said third hole (29) in said connector body for locking said plate lid (6.6) into a closed position in which said plate lid contacts said rim (5.3) so as to cover said opening, and a short spring leg (26.3) with a second free end (26B) reaching into said fourth hole in said connector body for anchoring said biasing leg spring (26) to said connector body, whereby said plate lid (6.6) can be rotated about said hinge pin (25) into an open position in which said plate lid at least partially uncovers said opening when said first free end (26A) of said long spring leg is removed from at least said third hole (29).

7. The connector of claim 6, further comprising a locking device (27, 28) connected to a free end of said hinge pin (25) and protruding radially outwardly from said hinge pin at said free end so as to retain said biasing leg spring (26) on said hinge pin by preventing said biasing leg spring from moving past said locking device off of said free end of said hinge pin, and to exert a pressing force onto said biasing leg spring toward said plate lid, so that said biasing leg spring presses against an outer surface of said plate lid (6.6) on said outer side, thus pressing said plate lid against said rim (5.3) when said plate lid (6.6) is in said closed position.

8. The connector of claim 6, wherein said wound central section applies a rotational spring force on said spring legs relative to each other about said hinge pin.

9. connector of claim 6, wherein said first free end of said long spring leg is further adapted to be removed from said second hole in said plate lid for enabling said plate lid to be rotated about said hinge pin into said open position.

10. A connector for joining sections of protective conduits for the installation of insulated electrical conductors in an aircraft, comprising a connector body forming a box (3A) including an open first body end section having an opening therein, a rim (5.3) surrounding said opening of said open first body end section, a closed second body end section and an intermediate body section (3) between said first and second body end sections, said box surrounding a cavity (5.2) in said box, said intermediate body section (3) comprising a wall having a plurality of holes (0) therein and nipples (4.3; 4.4; 4.5) connected to said wall and communicating with said holes, said nipples being adapted to have said conduits connected thereto and to provide access for said electrical conductors into said cavity (5.2) through said holes, a hinge (30) and a locking member (32) respectively connected to said connector body, and a plate lid (6.4, 6.5; 6.6, 6.7) including a cover plate that is lournalled on said hinge so as to be arranged on said rim to cover said opening of said open first body end section and including a curved, spring elastic extension (31) protruding from said cover plate, wherein said locking member (32) engages and secures said spring elastic extension (31) to said connector body, and said spring elastic extension to biases said cover plate into tight contact with said rim.

11. A connector for joining sections of protective conduits for the installation of insulated electrical conductors in an aircraft, comprising a connector body forming a box (3A) including an open first body end section having an opening therein, a rim (5.3) surrounding said opening of said open first body end section, a closed second body end section and an intermediate body section (3) between said first and second body end sections, said box surrounding a cavity (5.2) in said box, said intermediate body section (3) comprising a wall having a plurality of holes (0) therein and nipples (4.3; 4.4; 4.5) connected to said wall and communicating with said holes, said nipples being adapted to have said conduits connected thereto and to provide access for said electrical conductors into said cavity (5.2) through said holes, a plate lid arranged on said rim to cover said opening of said open first body end section, a mounting arm (30.1) connected to said connector body between two neighboring ones of said nipples (4.10, 4.11), a hinge supported by said mounting arm and carrying said plate lid on said hinge in a journalling manner, and a locking member connected to said connector body to engage and secure said plate lid on said rim to cover said opening.

* * * * *

UNITED STATES PATENT AND TRADEMARK OFFICE
CERTIFICATE OF CORRECTION

PATENT NO. : 5,901,986
DATED : May 11, 1999
INVENTOR(S) : Kirma

It is certified that error appears in the above-indentified patent and that said Letters Patent is hereby corrected as shown below:

Col. 8, line 50, after "holes", replace "(0)" by --(O)--.

Col. 9, line 28, after "being", replace "lournalled" by --journalled--.

Col. 10, line 18, after "holes", replace "(0)" by --(O)--;
line 25, after "is", replace "lournalled" by --journalled--;

line 42, after "holes", replace "(0)" by --(O)--.

Signed and Sealed this

Twenty-third Day of November, 1999

Attest:

Q. TODD DICKINSON

*Attesting Officer*   *Acting Commissioner of Patents and Trademarks*